7955X
O. ELLIS.
Machine for Mortising Window Sashes.
Patented January 16, 1834.
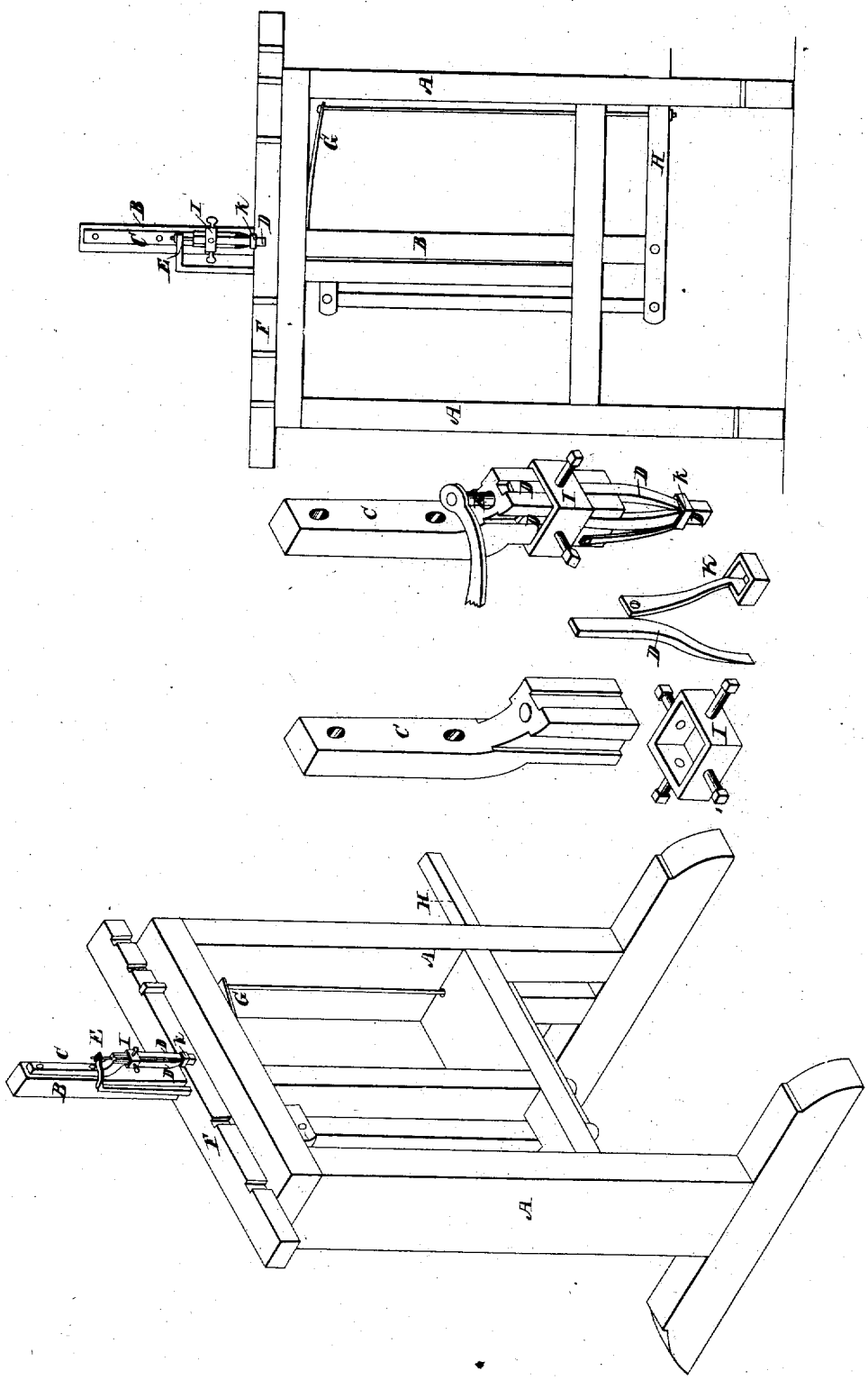
N. PETERS, Photo-Lithographer, Washington, D. C.

Jan. 16. 1834

Orin Ellis, of Orange, Mass.

Letters Patent

7965

The Schedule referred to in these Letters Patent and making part of the same containing
a description in the words of the said Orin Ellis himself of his improvement, in the machine
for mortising window sashes

———— " ————

To all to whom these presents shall come, Be it known that I Orin Ellis of Orange
in the County of Franklin and State of Massachusetts have invented a new and useful
machine for mortising window sashes, and that the following is a full and exact descrip-
tion of the construction and operation of the said machine as invented by me. —
Let there be two upright main posts with stands of any convenient size and of a con-
venient height secured at the top, by a horizontal cross beam of a suitable size and
length with mortises and tenons — and also secured at the bottom about nine inches from
the stands by another cross beam uniting the ~~parts~~ posts by tenons in the end of it, and mortises
in the ~~parts~~ posts. Let there be also an upright post of suitable dimensions with a proper
projection at the top for the purpose of receiving the upper end of a prop for a lever to be
hereafter described. The last mentioned post should be placed perpendicular between the
upper and lower horizontal posts, at any convenient distance from the left hand side
of the centre of the horizontal beams, tenoned at each into the horizontal beams. —
Let there be also an iron or wood prop of suitable dimensions with a hole at the upper
end to receive a bolt at the aforesaid projection, placed on the surface of the last men-
tioned upright post, on the back side, and extending down through the lower horizontal
cross beam about six inches with a succession of holes in the part that extends below the
lower horizontal cross beam, for raising and lowering the chisels hereafter to be described.
Let there be also a lever of convenient length and size, united to the prop with a bolt,
and extending to the right of the right hand main post, through an aperture made in
the right hand main post extending down from the lower cross beam to the stand
thereof. There should be a steel or wood spring secured to the upper cross beam by
screws or otherwise, upon the under side thereof and extended to the right hand main
post at the right hand end of which let fall a small cord passing down through a
holes made in the lower cross beam and attached to the lever, so that when the lever is
pressed down the spring will bring it back to its original position. — — or the same effect may be produced by attaching a weight to a pulley fixed on the under
side of the upper cross beam. also let there be a slide post of any convenient size sufficient to
give it strength. This slide post is to pass perpendicular through the centre of each of the
horizontal cross beams: mortises being made in the said beams sufficiently large to admit
the slide post and extending down through the lower cross beam and united to the lever
by a tenon inserted in a loose mortise in the lever, and secured by a bolt. The slide
post is also to extend up above the upper cross beam sufficiently high to affix a stock
for chisels so that when the slide part is thus placed, it will move down and up by the
operation of the lever — another part of the machine is what is called a rest or fence
of any suitable length, longer than the upper cross beam for the purpose of giving space
to receive the piece to be mortised — There should be notches or gains made in the
rest from each end of it, nearly to the slide post for the accommodation of moveable
stops on each side of the slide post. The fence or rest is to be placed and secured fast
on the upper side of the upper cross beams, lying on the surface upon the longitudinal
centre, the sliding post passing up through it through a mortise. In the notches or gains
on each side of the slide post there should be moveable stops, for the ends of the piece
to rest against which is mortised — another part of the machine consists of a stock
and chisels, which are designed to perform the works of mortising; described and placed
as follows: Let there be a cast iron stock of about nine inches long with a hole at
the upper end, and one at the upper end of the projection, to be described, to receive
bolts to fasten it to the slide post — There should be a sufficient projection at the lower
end of the stock, with four grooves, one on each side of the projection, for the insertion
of the chisels. The projection of the stock should be sufficient to carry the chisels out
directly over the place where the mortise is to be made in the piece when it is put
against the rest or fence. There should be four chisels of any size sufficient to
make the mortise, placed and made fast in the grooves of the projection of a stock by
means of an iron band, passing around the projection with screws bearing upon those
parts of the chisels which are in the grooves. The whole length of the chisels should
be five or six inches, or more if necessary, bent in at the lower ends and brought
together in such a manner as to give the form and size, which the mortise requires,
and secured by another iron band around them about three fourths of an inch from
the edges of the chisels; with an iron strap connected with the band and extending
up under the upper band, and then secured by a screw to prevent it sliding down over the edges of the chisels. There should be a perpendicular aperture through the projection of the stock, for the purpose of receiving a wrought iron punch, to fit the space formed between the chisels when inserted in the grooves of the stocks, and to clear that space of chips, in the operation of the machine. There should be an upright support attached to the sill or fence by a screw, and extending up the left hand side, of the slide post, having an arm around the slide post, with a hole through the end of the arm to receive the upper end of the punch. The upper end of the punch should be a screw. The stock with the chisels is to be placed & fasten upon the front side of the slide post at any convenient distance above the upper cross beam to give room under the edges of the chisels for the piece to be mortised — —

The end of the punch which is a screw is to pass through the hole in the end of the arm of the upright support having [nuts] cuts above and below the arm of the upright support, and contiguous to the arm, so that in the operation of the lever the punch will perform its office of clearing the chisels of chips when the chisels rise. The chisels may be united in one, taking the same form at the lower end, as the four do when separated. or one chisel may be used made in the form of a hollow square at the lower end with a shank to bolt it to the stock. The whole machine is designed to be operated by foot power, water power, or steam power — —

What is claimed as an invention, is an invention of a square chisel set in a stock and having a punch or clearer operating within the same, for mortising window sashes ———

Witnesses Drawing Orin Ellis

Almon Brainard

George Grennell (428 words)

Exd N.G.C.